L. J. TETLOW.
TROLLEY.
APPLICATION FILED MAR. 28, 1912.
1,046,235.
Patented Dec. 3, 1912.
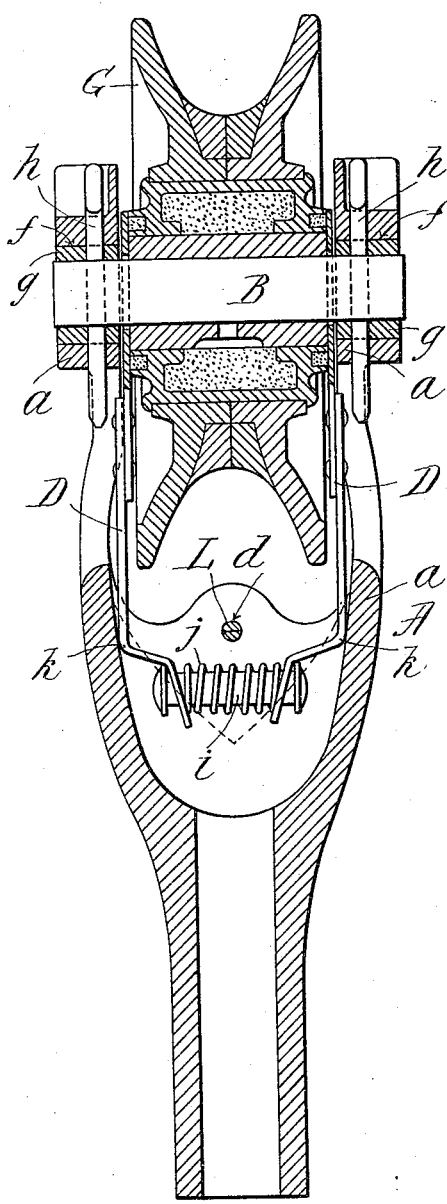
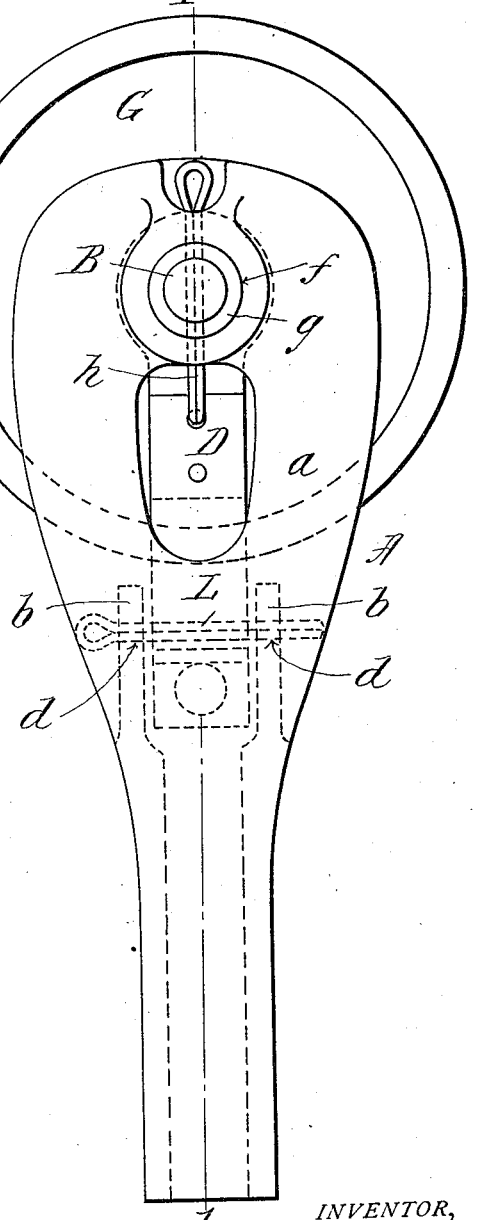
WITNESSES:
INVENTOR,
Lewis J. Tetlow,
BY
ATTORNEY.

UNITED STATES PATENT OFFICE.

LEWIS J. TETLOW, OF WEST SPRINGFIELD, MASSACHUSETTS, ASSIGNOR TO UNIVERSAL TROLLEY WHEEL COMPANY, OF NORTHAMPTON, MASSACHUSETTS, A CORPORATION OF MASSACHUSETTS.

TROLLEY.

1,046,235. Specification of Letters Patent. Patented Dec. 3, 1912.

Application filed March 28, 1912. Serial No. 686,764.

*To all whom it may concern:*

Be it known that I, LEWIS J. TETLOW, a citizen of the United States of America, and resident of West Springfield, in the county of Hampden and State of Massachusetts, have invented certain new and useful Improvements in Trolleys, of which the following is a full, clear, and exact description.

This invention relates to improvements in trolleys for electric railway cars, and its object is to provide a means for the retention and saving in the harp of the united pair of contact springs in cases, comparatively frequent considering the large number of trolleys in use, of the loosening and displacement of the axle and the loss of the trolley wheel.

To this end the invention consists in the combination or arrangement of parts and the construction of certain of the parts all substantially as hereinafter described and set forth in the claim.

In the drawings:—Figures 1 and 2 are a vertical longitudinal sectional view centrally through the improved harp from top to bottom thereof, and a side elevation, respectively,—line 1—1 on Fig. 2 indicating the plane on which the sectional view is taken.

In the drawings, A represents the trolley harp having the opposed upstanding jaws or cheeks $a$ $a$ substantially as usual, and the harp as will be especially perceived is made at the lower portion thereof adjacent the base of the jaws with opposite walls or members $b$ $b$ formed with alined perforations $d$ $d$ therethrough.

The harp is to be made of any suitable inexpensive metal, such as malleable iron, and the jaws thereof are made with circular apertures $f$ $f$ therethrough, receiving therein hardened steel annular bushings $g$ engaged with a hard driving fit in the apertures.

B represents the axle pin closely fitted through the annular bushings $g$ $g$ and retained by the cotter pins $h$ $h$ which are inserted in holes drilled through the harp jaws, the bushings and the axle at right angles to the length of the latter.

D D represent a pair of contact springs united to each other at their lower portions by the bolt or rivet $i$ having heads or shoulders at their outer ends, the extremities of the contact springs engaged or held by the bolt or rivet being encircled by a spiral spring $j$ reacting oppositely against the contact springs in outward directions so that such springs at intermediate portions $k$ $k$ thereof have yielding bearings against the inner faces of the harp jaws, the extremities of the springs as usual embracing the axle and bearing on the ends of the hub portion of the trolley wheel G. The paired springs joined at their lower portions and yieldingly reactive outwardly are substantially such, and employed for the advantage, as set forth in an application for Letters Patent of the United States filed by me May 11, 1911, Serial No. 626,745.

L represents a pin engaged through the aforementioned perforations $d$ $d$ in the members $b$ $b$ at the base of the harp which are arranged at right angles to approximately vertical surfaces of the harp jaws. This pin is one of a self retaining character for use in the situation shown, and is preferably a spring pin or cotter pin.

In case the axle should become broken, or its connections unfastened and such axle and the wheel lost from the harp, the paired and bottom united springs which are unattached relatively to the harp would still be retained from being lost from the harp by the part $d$ here provided for such purpose.

I claim:—

In combination, a trolley harp having opposed upstanding jaws, and having at the lower portion thereof upstanding opposite members in planes at right angles to the jaws and formed with alined perforations horizontally therethrough, an axle supported by the harp jaws, and a trolley wheel mounted on the axle, a pair of contact springs united to each other at their lower portions, the extremities thereof embracing the axle and bearing on the ends of the hub portion, said springs being unattached relatively to the harp and adapted for yielding bearings at intermediate parts thereof against the inner faces of the harp jaws, and a pin engaged through the perforations of said opposed members and traversing the space above the place of union of the pair of contact springs.

Signed by me at Springfield, Mass., in presence of two subscribing witnesses.

LEWIS J. TETLOW.

Witnesses:
G. R. DRISCOLL,
WM. S. BELLOWS.

Copies of this patent may be obtained for five cents each, by addressing the "Commissioner of Patents, Washington, D. C."